May 10, 1966
L. GARWIN
3,250,080
METHOD OF SEPARATING GASEOUS MIXTURES BY DIFFUSION
AND FRACTIONATION
Filed Nov. 7, 1962
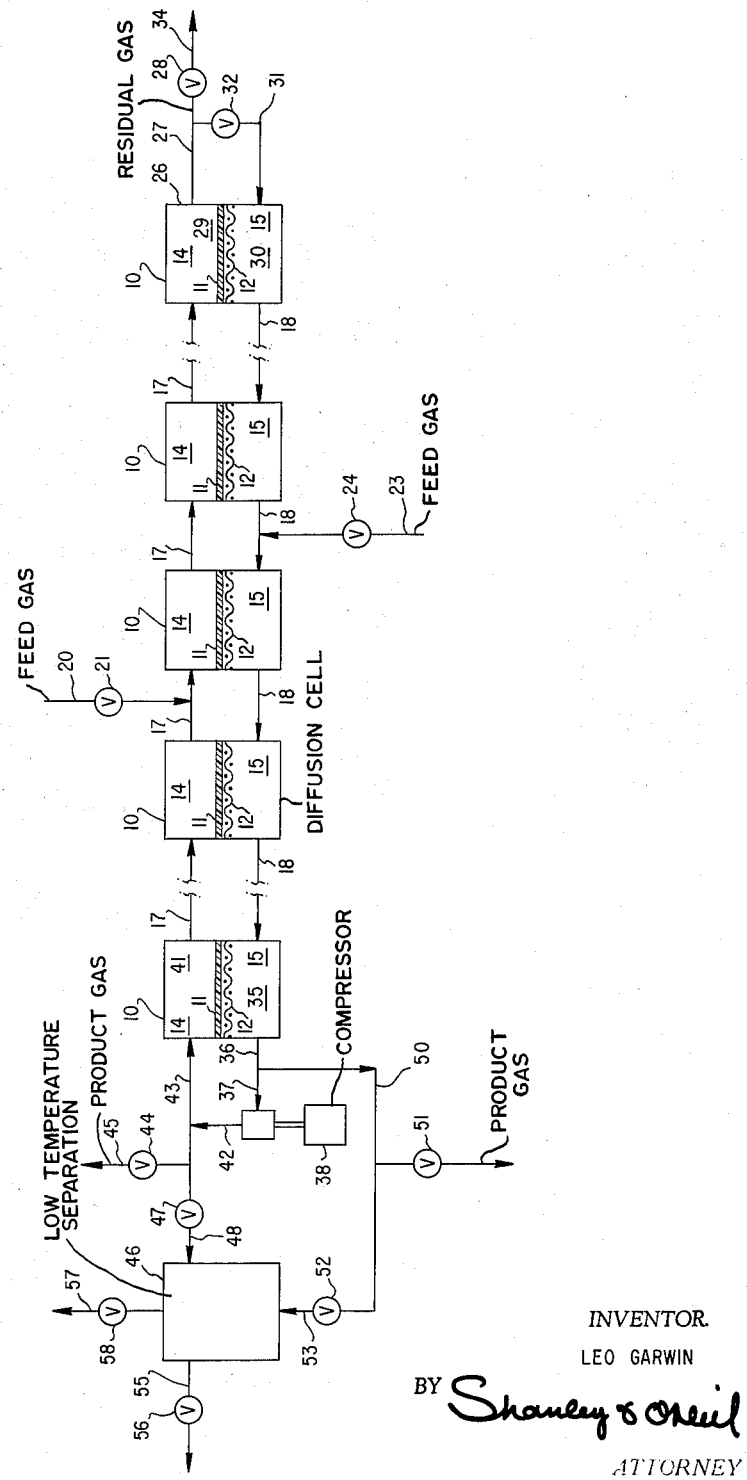
INVENTOR.
LEO GARWIN
BY Shanley & O'Neil
ATTORNEY United States Patent Office 3,250,080
Patented May 10, 1966

3,250,080
METHOD OF SEPARATING GASEOUS MIXTURES BY DIFFUSION AND FRACTIONATION
Leo Garwin, Oklahoma City, Okla., assignor to Kerr-McGee Oil Industries, Inc., a corporation of Delaware
Filed Nov. 7, 1962, Ser. No. 236,050
5 Claims. (Cl. 62—24)

This invention broadly relates to the fractionation of gaseous mixtures containing first and second components having different diffusion rates. In some of its more specific aspects, the invention further relates to the separation of a helium or hydrogen-rich fraction from gaseous mixtures containing the same.

The recovery of helium and/or hydrogen from gaseous mixtures in which they occur is very difficult. This is especially true when the helium or hydrogen is present in the gaseous mixture in small amounts in admixture with low boiling gases such as oxygen, nitrogen, carbon monoxide and methane which are relatively difficult to remove by chemical scrubbing. One method in use involves low temperature liquefaction and fractionation in which the gases are cooled to a temperature sufficiently low to liquefy all except the desired helium or hydrogen which remains in the gaseous state. Low temperature liquefaction and fractionation is usually termed the "Linde Process," and requires expensive, complicated equipment which is costly to operate. When the gaseous feed mixture contains only a small percentage by volume of the desired helium or hydrogen, the process is uneconomic.

Helium is available in large quantities in natural gas, but it is usually present in low concentrations and is expensive to separate in high purity. This is especially true in instances where the natural gas contains only one-half to two percent by volume of helium as the methods available heretofore for separating such low concentrations have not been entirely satisfactory.

An example of a highly selective separation of helium from gaseous mixtures such as natural gas involves diffusion through thin glass or quartz membranes which may be constructed in the form of capillary tubes. While the process has excellent selectivity and will produce a diffusate containing high percentages of helium, the diffusion rate is very low and high pressures are required. The temperature may be increased in an attempt to increase the diffusion rate, but this results in cracking and carbonization of the hydrocarbon components and the decomposition products foul the equipment. It is not possible to burn off the carbon deposits as an oxygen molecule is too large to enter the pores of the glass or quartz membrane. Also, a small amount of hydrogen is produced during cracking of the natural gas and it diffuses and lowers the purity of the helium product.

Conventional, large pore semi-permeable membranes have an advantage in that the rate of gas permeation is much greater than for glass or quartz capillaries. As a result, practical rates of diffusion are obtained at ambient temperature and at moderate pressure. The increase in pore size permits molecules larger than helium or hydrogen to pass through and the selectivity of the separation is imparied, but the diffusate is enriched in helium or hydrogen. For instance, helium diffuses about twice as fast through a semi-permeable membrane as does methane under the same conditions. The lower selectivity obtainable heretofore has limited the potential of large pore semi-permeable membrane separation processes where high rates of diffusion must be achieved.

It is an object of the present invention to provide a novel method and improved apparatus for fractionating gaseous mixtures containing first and second components having differing diffusion rates.

It is a further object to provide a novel method and improved apparatus for separating gaseous mixtures by diffusion in which relatively large pore semi-permeable membranes may be used to produce a fraction containing a high percentage of the desired gaseous component.

It is still a further object to provide a novel method and improved apparatus whereby helium may be separated from natural gas at low cost even though the helium is present in small percentages.

It is still a further object to provide a novel method and improved apparatus for preparing a feed for low temperature liquefaction and fractionation apparatus from a gaseous mixture containing a desired gaseous component in small amounts.

Still other objects and advantages of the invention will be apparent to those skilled in the art upon reference to the following detailed description and the drawing, which illustrates a preferred arrangement of apparatus for use in practicing the invention.

In accordance with one embodiment of the present invention, a series of diffusion cells having high and low pressure sides separated by a semi-permeable membrane are connected by conduits to provide communication between the high pressure side of each diffusion cell and the high pressure side of its neighboring diffusion cells, on the one hand, and between the low pressure side of each diffusion cell and the low pressure side of its neighboring diffusion cells, on the other hand. This arrangement allows a gaseous feed mixture to be fractionated to be passed under relatively high pressure successively through the high pressure sides of the series of diffusion cells, and diffused gas under relatively low pressure to be passed countercurrent thereto and successively through the low pressure sides of the series of diffusion cells. A portion of the diffused gas is withdrawn from a low pressure side, compressed and introduced into a high pressure side for recycle in the process. Only one compressor is necessary for circulating the gas streams through the high and low pressure sides of the group of cells.

A product stream of diffused gas enriched in the more diffusible component may be withdrawn from a low pressure side in the series, and similarly residual gas enriched in the less diffusible component may be withdrawn from a high pressure side in the series. Fresh gaseous mixture to be fractionated may be supplied to the system at any suitable point, but preferably at a point at which the composition of the gaseous stream flowing in the system and that of the fresh gas are approximately the same insofar as the more diffusible component is concerned. A portion of the diffused gas product may be subjected to low temperature liquefaction and fractionation to obtain a fraction further enriched in the desired component of the gaseous mixture.

Referring now to the drawing, the diffusion apparatus may include a series of diffusion cells 10 which are separated by semi-permeable membranes 11 and porous back-up or strengthening members 12 into a series of high pressure sides or zones 14 and low pressure sides or zones 15. The series of high pressure sides 14 are interconnected for gas flow therethrough by a series of conduits 17, and similarly the low pressure sides 15 are interconnected for gas flow therethrough by means of conduits 18. Fresh gaseous mixture to be fractionated containing first and second components having different diffusion rates may be supplied to the system via conduit 20 at a rate controlled by valve 21 when it is desired that the feed be to the high pressure sides. The fresh gas may be fed to the low pressure sides if desired via conduit 23 including valve 24. Normally, the fresh gas is fed into the system at only one point, and for best results the gas should be fed at a point where it contains approximately the same concentration of the most diffusible component as the gas flowing in the system at that point.

Residual gas enriched in the less diffusible component may be withdrawn from the last diffusion cell 26 in the series via conduit 27 and open valve 28. If desired, a portion of the residual gas may be passed from the high pressure side 29 of diffusion cell 26 to the low pressure side 30 of diffusion cell 26 via conduits 27 and 31 upon opening reducing valve 32. Normally, valve 32 is set to allow passage of a portion only of the residual gas withdrawn via conduit 27, thereby allowing a flow of residual gas to be maintained at point 34 of conduit 27. Recycle of residual gas to low pressure side 20 is not essential, but when used, may improve the separation.

Diffused gas is withdrawn from the last low pressure side 35 in the series via conduit 36 and a portion is passed via conduit 37 to compressor 38. Diffused gas may be compressed to a pressure at least as great as that existing in the first high pressure side 41 and passed thereto via conduits 42 and 43. A high pressure stream of diffused gas may be withdrawn as a product upon opening valve 44 in conduit 45, or a high pressure stream may be passed to low temperature liquefaction and fractionation apparatus 46 upon opening valve 47 in conduit 48. If desired, a low pressure diffusate product may be withdrawn via conduit 50 upon opening valve 51, or the low pressure diffusate may be passed to low temperature liquefaction and fractionation apparatus 46 upon opening valve 52 in conduit 53.

The apparatus 46 may be of a prior art construction suitable for the low temperature liquefaction and fractionation of gaseous mixtures containing components having different boiling points to thereby produce a stream enriched in a first component which may be withdrawn via conduit 55 upon opening valve 56 and a stream enriched in a second component which may be withdrawn via conduit 57 upon opening valve 58. Such apparatus is well known in the art for liquefaction and fractionation of gaseous mixtures by the Linde process. The details of the specific apparatus employed do not comprise a part of this invention and are not shown in the drawing in the interest of clarity.

In operating the apparatus, a compressed stream of gaseous mixture to be fractionated is introduced into the first high pressure side 41 in the series via conduit 43, and then passes successively through high pressure sides 14 via conduits 17. As the gaseous mixture passes through the series of cells, the more diffusible component diffuses through semi-permeable membranes 11 and porous backup members 12 into low pressure sides 15, and the residual gas becomes depleted in the more diffusible component. Upon reaching the high pressure side 29 of diffusion cell 26, it is withdrawn via conduit 27 and may be passed to the atmosphere upon closing reducing valve 32 and opening valve 28. If desired, a portion of the residual gas may be recycled in the process. This may be accomplished by opening valve 32 to allow passage of a portion of the residual gas via conduit 31 to the first low pressure side 30. The residual gas together with the diffused gas then flows successively through the series of low pressure sides 15.

A portion of the diffused gas is withdrawn from the last low pressure side 35 in the series and passed via conduits 36 and 37 to compressor 38, where it is compressed and then passed via conduit 42 to conduit 43 for recycle in the high pressure sides 14. A further portion of the high pressure diffused gas may be withdrawn as a product via conduit 45 upon opening valve 44, or passed to low temperature liquefaction and fractionation apparatus 46 for further purification upon opening valve 47 in conduit 48. If desired, a low pressure diffused product may be withdrawn via conduit 50 upon opening valve 51, or passed to low temperature liquefaction and fractionation apparatus 46 for further purification upon opening valve 52 in conduit 53. The diffused gas enriched in the more diffusible component is subjected to low temperature liquefaction and fractionation in apparatus 46, where it is further purified. A fraction further enriched in the more diffusible component may be withdrawn via conduit 55 upon opening valve 56, and a fraction containing the less diffusible component may be withdrawn via conduit 57 upon opening valve 58.

Any suitable semi-permeable membrane material may be used as it is only required that it be preferentially selective with respect to one of the components of the gaseous mixture. The selectivity of the semi-permeable membrane 11 must be such as to be different from unity and the wider the departure from unity, the more readily is the enrichment accomplished whether measured in terms of number of sides or the amount of gas which needs be recycled in the system.

Specific examples of semi-permeable membranes which may be employed in practicing the present invention are given below in Table I.

TABLE I

*Summary of diffusion membrane data*

| | Trade Name | Manufacturer | Thickness, in. | P at 25° C. (cc.-cm./sec.-cm.$^2$-cm. Hg) | | | | |
|---|---|---|---|---|---|---|---|---|
| | | | | He | $N_2$ | $CH_4$ | $H_2$ | $C_2H_6$ |
| Plastic: | | | | | | | | |
| Polyethylene tubes | | Plax Corp. | 0.006 | | | | 0.58×10$^{-9}$ | 0.99×10$^{-9}$ |
| Polyethylene | DE-2500 | | 0.0015 | | 0.555×10$^{-9}$ | 0.093×10$^{-9}$ | 0.82×10$^{-9}$ | |
| Polyethylene | Visking Visqueen DE-2400. | Visking Corp. | 0.0013 | | 0.615×10$^{-9}$ | 0.123×10$^{-9}$ | 0.855×10$^{-9}$ | |
| Copolymer polyvinyl chloride and polyvinyl acetate. | Bakelite VB-1930. | Bakelite Co. | 0.0011 | | 0.065×10$^{-9}$ | 0.065×10$^{-9}$ | 0.99×10$^{-9}$ | |
| Polyethylene terephthalate polymer. | Mylar film 25-V-200. | Du Pont | 0.0003 | | 0.097×10$^{-9}$ | | 0.058×10$^{-9}$ | |
| Cellulose acetate butyrate. | Kodapak II regular. | Eastman Kodak | 0.001 | | 1.43×10$^{-9}$ | | 2.10×10$^{-9}$ | |
| Silicone rubber coated fabric. | Chlorlastic No. 3010. | Connecticut Hard Rubber Co. | 0.010-0.020 | | | 10×10$^{-9}$ | 25×10$^{-9}$ | |
| Ethyl cellulose | | Dow Chem. Co. | | | | 0.84×10$^{-9}$ | 3.20×10$^{-9}$ | |
| Polystyrene | | Dow Chem. Co. | | | | 0.78×10$^{-9}$ | 9.10×10$^{-9}$ | |
| Polybutadiene | | | | | | 0.65×10$^{-9}$ | | |
| Glass capillaries: | | | | | | | | |
| Silica | | } Bell Telephone Laboratories. | } 0.003-0.005 | } {2×10$^{-11}$ {1×10$^{-12}$ | | | | |
| Pyrex | | | | | | | | |
| Porous glass | | Corning Glass Works. | 0.045 | 1.1×10$^{-5}$ | 0.42×10$^{-5}$ | 0.55×10$^{-5}$ | 1.6×10$^{-5}$ | |
| Ceramic membrane | | Selas Corp. of America. | 0.125 | 5.0×10$^{-4}$ | 2.0×10$^{-4}$ | | 7.0×10$^{-4}$ | |

Preferably, porous backup or strengthening members 12 are used to prevent rupturing of the semi-permeable membranes 11. The member 12 may be formed from felt, glass wool, or other suitable porous material which may be retained in contact with the semi-permeable membrane as a support.

It is preferred that the surface area of the semi-permeable membrane be such so as to assure diffusion of approximately the same volume of gas in each diffusion cell. This may be accomplished by controlling the pressure differential between the high pressure and low pressure sides of a given diffusion cell. When maintaining a substantially equal higher pressure within the high pressure sides, and a substantially equal lower pressure in the low pressure sides, the volume of gas which is diffused in each cell may be controlled by modifying the surface area of the semi-permeable membrane, or by controlling the porosity of the diffusion membrane in the side.

A preferred membrane for use in any specific instance will vary with the nature of the diffusing gas. The membrane preferably has a pore diameter significantly smaller than the mean-free path of the diffusing gas, which is the average distance a gas molecule travels before it collides with another molecule. The mean-free path is inversely proportional to the pressure of the gas and has a value of about $10^{-5}$ centimeters (1000 angstroms) at atmospheric pressure and room temperature for helium. As the pore diameter of the membrane is made smaller, the membrane becomes more selective but the rate of diffusion of the gas through the membrane is lower and higher differentials are required for a given rate of diffusion. The rate of diffusion of a given gas varies directly with the area and the partial pressure difference of diffusible component across the membrane, and inversely with the membrane thickness. The characteristics of a good membrane are as follows: (a) the membrane should contain no holes, so as to avoid hydro-dynamic flow which is non-selective; (b) the membrane should have high permeability, to obtain rapid diffusion therethrough; (c) the membrane should be thin, as the diffusion rate is inversely proportional to thickness; (d) the membrane should have high strength; and (e) be durable.

The pressure differential between the low and high pressure sides of a diffusion cell should be sufficient to provide an adequate rate of diffusion, but otherwise is not critical provided the membrane has sufficient mechanical strength to withstand the pressure level. For example, the pressure differential may be about 5–100 p.s.i. The temperature of the gaseous mixture being fractionated may vary from ambient temperature, or below, to several hundred degrees Fahrenheit depending upon the membrane material. Many plastic materials begin to soften and lose their properties at temperatures above 130–150° F., while glass and ceramic membranes may be used at much higher temperatures. Thus, the selection of a specific temperature, as well as the selection of a specific pressure, is within the skill of the art.

Specific gaseous mixtures which are suitable for processing in accordance with the present invention include those containing helium or hydrogen as a diffusible component, and especially helium-methane and helium-nitrogen gaseous mixtures. Natural gas containing helium in small amounts such as 0.5–2% by volume may be fractionated to provide a feed for low temperature liquefaction and fractionation apparatus containing 8–50% or more helium by volume. It is also possible to prepare substantially pure helium provided a sufficient number of diffusion stages or degree of recycle is used.

The foregoing detailed description and the drawing are for purposes of illustration only, and are not intended as being limiting to the spirit or scope of the appended claims.

What is claimed is:

1. A method of fractionating a fresh gaseous mixture containing first and second components having different diffusion rates in a semi-permeable diffusion cell comprising
    introducing the fresh gaseous mixture at a feed point intermediate in point of flow in a series of diffusion cells so that there is a plurality of diffusion cells on either side of the point of introduction,
    each of the diffusion cells having a high pressure zone and a relatively low pressure zone separated by a sheet-like diffusion barrier of semi-permeable polymeric material,
    the gaseous mixture being passed successively through the high pressure zones of the series of diffusion cells,
    the diffusion barriers being selectively permeable with respect to the first component of the gaseous mixture whereby the first component diffuses therethrough from the high pressure zones to the low pressure zones faster than the second component,
    intimately contacting the gaseous mixture in the high pressure zones with the diffusion barriers to thereby diffuse gas relatively rich in the first component into the low pressure zones and provide a residual gas enriched in the second component,
    withdrawing the residual gas from the last of the high pressure zones in point of flow, expanding a portion of the withdrawn residual gas to the pressure of the low pressure zones and reintroducing it into the last of the low pressure zones in point of flow and discharging the remainder,
    passing the diffused gas enriched in the first component and the expanded residual gas as a diffused gaseous mixture under a relatively low pressure successively through the series of low pressure zones,
    the flow of the diffused gaseous mixture through the low pressure zones being countercurrent to the flow of gaseous mixture through the high pressure zones,
    withdrawing a first portion of the diffused gaseous mixture from the last of the low pressure zones in point of flow,
    compressing a first portion of the diffused gaseous mixture and passing the compressed gas successively through the series of high pressure zones upstream from the feed point of the fresh gaseous mixture, and introducing the remaining portion of the diffused gaseous mixture into a fractionating column to produce a gaseous fraction which is further enriched in the first component.

2. The method of claim 1 wherein the first and second components have different boiling points,
    and a withdrawn fraction enriched in a desired component is subjected to low temperature liquefaction and fractionation to produce a gaseous fraction which is further enriched in the desired component.

3. The method of claim 1 wherein about the same volume of gas is diffused in each of the diffusion cells.

4. The method of claim 1 wherein a gaseous mixture containing helium is fractionated.

5. The method of claim 1 wherein a gaseous mixture containing hydrogen is fractionated.

References Cited by the Examiner

UNITED STATES PATENTS

| | | | |
|---|---|---|---|
| 1,496,757 | 6/1924 | Lewis | 55—16 |
| 2,159,434 | 5/1939 | Frey | 55—16 X |
| 2,540,151 | 2/1951 | Weller | 55—16 |
| 2,540,152 | 2/1951 | Weller | 55—16 |
| 2,699,836 | 1/1955 | Barton | 55—158 |
| 2,964,124 | 12/1960 | Peierls | 55—16 |
| 2,970,106 | 1/1961 | Binning | 55—16 X |
| 3,144,313 | 8/1964 | Pfefferle | 55—16 X |

NORMAN YUDKOFF, *Primary Examiner.*

J. C. JOHNSON, *Assistant Examiner.*